United States Patent [19]

Feal et al.

[11] Patent Number: 4,953,081

[45] Date of Patent: Aug. 28, 1990

[54] LEAST RECENTLY USED ARBITER WITH PROGRAMMABLE HIGH PRIORITY MODE AND PERFORMANCE MONITOR

[75] Inventors: Brice J. Feal, Endicott; Donald J. Hanrahan; David J. Shippy, both of Endwell, all of N.Y.

[73] Assignee: International Business Machines Corporation, Armonk, N.Y.

[21] Appl. No.: 288,797

[22] Filed: Dec. 21, 1988

[51] Int. Cl.⁵ .............................................. G06F 13/14
[52] U.S. Cl. .................. 364/200; 364/242.6; 364/242.8
[58] Field of Search .................... 364/200, 900; 340/825.5

[56] References Cited

U.S. PATENT DOCUMENTS 4,611,297  9/1986  Dudley et al. ...................... 364/900
4,789,926  12/1988  Clarke ................................ 364/200

OTHER PUBLICATIONS

IEE Reprint Performance Analysis of High-Speed Digital Buses for Multiprocessing Systems, by W. L. Bain, Jr. and S. R. Ahuja, Bell Laboratories, 1981, pp. 107–133.

Primary Examiner—Raulfe B. Zache
Attorney, Agent, or Firm—Baker, Maxham Jester & Meador

[57] ABSTRACT

In a data bus system which links a plurality of users, user access to the bus is provided by an arbiter which responds to a plurality of user requests for bus access by employing an adjustable priority scheme for granting access. When a user has access to the bus, the arbiter updates user priority by assigning the lowest priority to the current user and upwardly adjusting the priorities of all currently-requesting users.

9 Claims, 10 Drawing Sheets

FIG. 4

| TIME PERIOD | BUS REQUEST ABCD | BUS GRANT | A>B | A>C | A>D | B>A | B>C | B>D | C>A | C>B | C>D | D>A | D>B | D>C |
|---|---|---|---|---|---|---|---|---|---|---|---|---|---|---|
| T0 | 1111 |    | 1 | 1 | 1 | 0 | 1 | 1 | 0 | 0 | 1 | 0 | 0 | 0 |
| T1 | 1111 | AG |   |   |   |   |   |   |   |   |   |   |   |   |
| T2 | 1111 |    | 0 | 0 | 0 | 1 | 1 | 1 | 1 | 0 | 1 | 1 | 0 | 0 |
| T3 | 1111 | BG |   |   |   |   |   |   |   |   |   |   |   |   |
| T4 | 1111 |    | 1 | 0 | 0 | 0 | 0 | 0 | 1 | 1 | 1 | 1 | 1 | 0 |
| T5 | 1111 | CG |   |   |   |   |   |   |   |   |   |   |   |   |
| T6 | 1111 |    | 1 | 1 | 0 | 0 | 1 | 0 | 0 | 0 | 0 | 1 | 1 | 1 |
| T7 | 1111 | DG |   |   |   |   |   |   |   |   |   |   |   |   |
| T8 | 1111 |    | 1 | 1 | 1 | 0 | 1 | 1 | 0 | 0 | 1 | 0 | 0 | 0 |

FIG. 8

| TIME PERIOD | BUS REQUEST ABCD | BUS GRANT | A>B | A>C | A>D | B>A | B>C | B>D | C>A | C>B | C>D | D>A | D>B | D>C |
|---|---|---|---|---|---|---|---|---|---|---|---|---|---|---|
| T0  | 1010 |    | 1 | 1 | 1 | 0 | 1 | 1 | 0 | 0 | 1 | 0 | 0 | 0 |
| T1  | 1010 | AG | 0 | 1 | 1 | 1 | 1 | 1 | 0 | 0 | 1 | 0 | 0 | 0 |
| T2  | 0010 |    | 0 | 1 | 1 | 1 | 1 | 1 | 0 | 0 | 0 | 0 | 0 | 1 |
| T3  | 0010 | CG | 1 | 1 | 1 | 0 | 1 | 1 | 0 | 0 | 0 | 0 | 0 | 1 |
| T4  | 0010 |    | 0 | 1 | 1 | 1 | 1 | 1 | 0 | 0 | 0 | 0 | 0 | 1 |
| T5  | 1111 | BG | 1 | 1 | 1 | 0 | 1 | 1 | 0 | 0 | 1 | 0 | 0 | 0 |
| T6  | 1011 |    | 0 | 1 | 1 | 1 | 1 | 1 | 0 | 0 | 0 | 0 | 0 | 1 |
| T7  | 1011 | AG | 0 | 1 | 1 | 1 | 1 | 1 | 0 | 0 | 0 | 0 | 0 | 1 |
| T8  | 0011 |    | 0 | 1 | 1 | 1 | 1 | 1 | 0 | 0 | 1 | 0 | 0 | 0 |
| T9  | 0011 | DG | 0 | 1 | 1 | 1 | 1 | 1 | 0 | 0 | 0 | 0 | 0 | 1 |
| T10 | 0010 |    | 0 | 1 | 1 | 1 | 1 | 1 | 0 | 0 | 0 | 0 | 0 | 1 |
| T11 | 0010 | CG | 0 | 1 | 1 | 1 | 1 | 1 | 0 | 0 | 1 | 0 | 0 | 0 |
| T12 | 0000 |    | 0 | 1 | 1 | 1 | 1 | 1 | 0 | 0 | 0 | 0 | 0 | 1 |

LEAST RECENTLY USED ARBITER WITH PROGRAMMABLE HIGH PRIORITY MODE AND PERFORMANCE MONITOR

CROSS REFERENCE TO RELATED PATENT APPLICATIONS

This application is related to co-pending U.S. patent application Ser. No. 07/211,584, entitled "SIMULTANEOUS TRANS-PROCESSOR BROADCAST OF MACHINE CONDITIONS IN A LOOSLY-COUPLED MULTI-PROCESSOR SYSTEM"; U.S. patent application Ser. No. 211,469, entitled "APPARATUS FOR PARTITIONED CLOCK STOPPING IN RESPONSE TO CLASSIFIED PROCESSOR ERRORS"; U.S. patent application Ser. No. 288,639, entitled "PROGRAMMABLE QUIESCE APPARATUS FOR RETRY, RECOVERY AND DEBUG"; and U.S. patent application Ser. No. 291,543, entitled "MESSAGE BUFFER APPARATUS FOR AN INPUT/OUTPUT CONTROL PROCESSOR", all assigned to the Assignee of this application.

BACKGROUND OF THE INVENTION

This invention relates to devices and methods for bus arbitration of a common bus shared by a plurality of users. More specifically, the invention relates to a bus arbitration apparatus and method which uses a least recently used (LRU) algorithm while having a programmable priority mode feature for providing bus users of a high priority greater access to the bus over low priority bus users, and provisions for monitoring bus activity.

In computer systems, design tradeoffs in circuit packaging, technology, cost and system performance often result in the implementation of shared buses for the transfer of information such as data, commands or other messages. In systems that utilize high speed parallel buses which interconnect several devices of similar function and bus priority, it is necessary that each device be given sufficient allocation in bus access to balance bus utilization, i.e., bandwidth. For optimum operation, it is also necessary that the average wait time for all devices in accessing the bus be as small as possible. It is further necessary for optimum performance that the arbitration mechanism which determines priority in access to the shared bus to be as fast as possible, particularly in terms of logic level transitions, to calculate the next device grant.

In bus arbitration schemes, several algorithms have been previously utilized in various forms. The most widely used algorithms for bus arbitration schemes use fixed priority. The most widely used dynamic algorithms are: the least recently used (LRU); the rotating daisy chain; and the first come, first serve. Implementation of a "dynamic" algorithm, such as the LRU algorithm in bus arbitration mechanisms is more desirable than other algorithm types, since the "dynamic" algorithm is typically more efficient in determining allocation of shared bus resources. However, the "dynamic" algorithms such as the LRU algorithm, are more expensive in logic element count and logic delays to implement. Regardless of the algorithm chosen, it is desirable to provide a high-speed implementation utilizing minimal delays in minimal logic circuitry. In the CMOS technology, particularly in the large scale integration technology, the speed of the arbiter is particularly important since off-chip driver delays are typically slow.

In selecting a bus arbitration algorithm, an important factor of consideration is the diversity of the input/output (I/O) devices attached to the system. Data processing systems typically have both time critical devices, such as direct access storage devices (DASD), along with less bandwidth intensive communications devices, such as printers. It is, therefore, desirable to give time-critical devices a higher percentage of bus bandwidth than slower devices.

The LRU algorithm has been incorporated into several dynamic bus arbitration mechanisms. One such implementation of an LRU algorithm is disclosed in U.S. Pat. No. 4,672,536, assigned to the Assignee of the present invention. In this implementation, an age value is assigned to each bus unit attached to a shared common bus. The requesting bus unit is granted access to the bus if it has an age value corresponding to the oldest request. However, implementation of this LRU arbitration scheme is slow; and requires substantial amounts of circuitry and input/output signals.

Another example of an LRU algorithm embodied in a bus arbitration scheme is disclosed in U.S. Pat. No. 4,663,756. In this particular bus arbiter, a memory is utilized to store priority codes assigned to bus units. These priority codes are used by the bus arbiter to determine which bus unit will have the highest priority after a grant. After a bus unit with the highest priority code has accessed the bus, its priority code is then set to the lowest priority with the priority of all other channels incremented by one. However, due to combinatorial logic limitations the disclosed bus arbiter will not always grant access to the bus in accordance with a pure LRU algorithm. Furthermore, utilization of a memory device also requires a substantial amount of associated circuitry and costs.

In certain applications of a bus arbitration scheme, it is desirable that certain bus units be given higher priority in access to the shared bus. It is desirable in these applications that the LRU algorithm be utilized in arbitration of bus requests between bus units in the high priority class. Furthermore, it is desirable that the LRU algorithm be utilized in arbitration of bus requests between bus units in the low priority class. According to this arbitration scheme, all high priority class bus requests would be serviced prior to servicing of low priority class bus requests.

In order to achieve optimum bus performance, it is necessary to balance bus utilization. Therefore, bus activity must be monitored to determine the activity relative to each bus user. Monitoring of bus activity is typically accomplished by including in the hardware, physical monitoring points to which monitoring devices are connected. Once a determination is made with respect to bus user activity, devices on one bus unit may be interchanged with devices on another bus unit. Thus, a bus unit with a high level of bus activity, as a result of having several high activity devices, can have one or more of the high activity devices exchanged with low activity devices of another bus unit. With the advent of very large-scale integration (VLSI) chip technology, it is difficult to monitor real time demand on shared buses by connecting measurement devices to hardware monitor points.

SUMMARY OF THE INVENTION

The apparatus of the present invention provides a means for determining priority in access to a common bus shared by a plurality of users. The apparatus incorporates a least recently used (LRU) algorithm embodied in a priority feedback means for providing a group of priority signals representative of a user priority hierarchy, and a priority means for receiving the priority signals from the priority feedback means and is responsive to a current user request status for providing a grant signal corresponding to a bus requesting user having a highest relative priority in the user priority hierarchy among the bus requesting users. The priority feedback means is responsive to the bus grant signal for updating the user priority signals with the updated user priority signals representative of an updated user priority hierarchy in which the requesting user corresponding to the grant signal has a lowest relative priority. The apparatus may further include priority mode means for establishing high and low priority bus user classes, with arbitration between bus requesting users in each class according to the LRU algorithm, and servicing of all high priority class bus user requests before servicing of low priority class bus user requests. Furthermore, the system may further include performance monitor means for enabling monitoring of bus activity.

It is, therefore, an object of the present invention to provide a novel and improved high-speed bus arbitration mechanism utilizing a least recently used (LRU) algorithm for providing access to a common bus shared by multiple bus users.

It is another object of the present invention to provide a bus arbiter utilizing a LRU algorithm while incorporating a programmability feature which permits certain bus users to be classified into a lower or higher priority classes with bus users in the high priority class being given a higher percentage of bus bandwidth.

It is yet another object of the present invention to provide a bus arbiter having a dynamic performance monitor for enabling the monitoring of real time demands on the bus.

It is still a further object of the present invention to provide a bus arbiter utilizing a LRU algorithm arbitration scheme implemented in minimal logic to enable the generation of grant signals with minimal delay.

Further scope of applicability of this invention will be evident when the detailed description given below is read with reference to the below-described drawings. It will, however, be manifest that the detailed description and specific examples given below, while indicating a preferred embodiment of the invention, serve only to illustrate it, since various elaborations, changes, and modifications within the spirit and scope of the invention will be evident to the skilled artisan.

BRIEF DESCRIPTION OF THE DRAWINGS

FIG. 4 is a table illustrating priority latch update over time when all requests are active.

FIG. 8 is a table illustrating the state of the arbiter with reference to the arbitration according to the exemplary timing diagram FIG. 7.

DETAILED DESCRIPTION OF THE INVENTION

Figure 1:
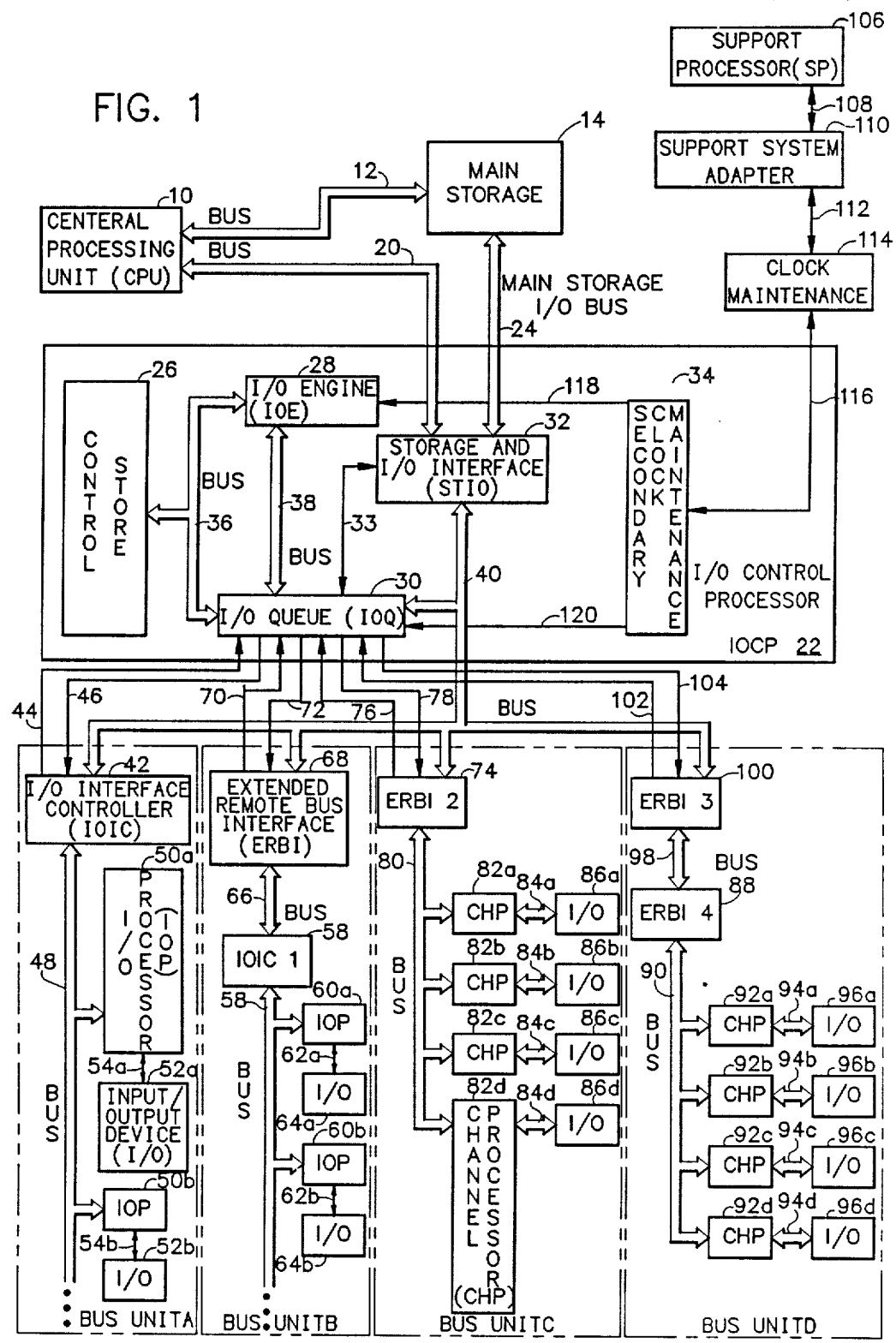
FIG. 1 is a block diagram of an overall computer system which incorporates the present invention.

FIG. 1 illustrates in block diagram form elements which form a digital computer system. The system includes a central processing unit (CPU) 10 which is coupled by bi-directional central processing unit (CPU) bus 12 to central storage device 14. Central storage device 14 includes a main storage control portion 16 and a main storage portion 18. CPU bus 12 is coupled to the main storage 18. Main storage 14 provides software level instruction and data storage. CPU 10 processes software level instructions that are stored in central storage 14.

CPU card 10 is also coupled by a bi-directional communications (C) bus or CBUS 20 to an I/O control processor (IOCP) 22. IOCP 22 is coupled by a bi-directional I/O (IO BUS) bus 24 to central storage 14. IOCP 22 processes all software level I/O instructions stored in main storage 14 in addition to controlling the flow of information between I/O devices and main storage 14. IOCP 22 is coupled by C bus 20 so as to permit either processor, CPU 10 or IOCP 22, to transfer interrupt or control information to one another.

IOCP 22 is comprised of control store element 26, an I/O engine (IOE) element 28, an I/O queue (IOQ) element 30, a storage and I/O interface (STIO) 32 element, a clock source (not shown), and a secondary clock maintenance (SECMAINT) apparatus 34.

IOE element 28 and IOQ element 30 are the processor elements of the IOCP 22. IOE element 28 and IOQ element 30 are coupled to control store 26 by control store (CS) bus 36 in order to access microcode program instructions stored in control store 26. IOE element 28 and IOQ element 30 execute microcode instructions with the program including various routines necessary to perform the various I/O functions and operations required of IOCP 22 in processing I/O instructions. Both IOE element 28 and IOQ element 30 receive a 4-byte microword, in parallel, from control store 26 on CS bus 36. However, one or both of IOE element 28 and IOQ element 30 execute the microword depending upon the specific microword. Typically, IOE element 28 executes arithmetic and logic microwords, while IOQ element 30 executes microwords which interface with units beyond the bounds of IOCP 22. IOQ element 30, for example, executes microword relative to operations which relate to CPU 10, main storage 14 or various I/O devices. Both IOE element 28 and IOQ element 30 execute the type of microword which instructs an operation for moving data between IOE element 28 and IOQ element via a bi-directional external bus 38 coupled between IOE element 28 and IOQ element 30.

IOQ 30 is also coupled by an address/data/communication (ADC) bus 40 to STIO element 32. STIO element 32 functions as an interface for passing data and instructions between CPU 10 and IOQ element 30, and between main storage 14 and IOQ element 30. STIO element 32 includes buffers and various other logical elements for message storage and transfer control. STIO element 32 is coupled by line 33 to IOQ element 30 to provide bus activity status data to IOQ element 30.

IOCP 22 further includes SECMAINT apparatus 34 which is coupled to IOE element 28, IOQ element 30 and STIO element 32 to provide, among other functions, suspension of clock signals to certain elements of IOCP card 22 should an error be detected in IOCP card 22. Although the SECMAINT apparatus 34 does not form a part of the present invention, further description of the clock suspension feature is found in co-pending U.S. patent application Ser. No. 211,469, entitled "APPARATUS FOR PARTITIONED CLOCK STOPPING IN RESPONSE TO CLASSIFIED PROCESSOR ERRORS" referenced above. SECMAINT apparatus 34 further provides a communication path between the IOCP 22 and monitoring and error detection hardware discussed later.

IOCP card 22 is coupled by ADC bus 40, and a series of bus request lines 44, 70, 76, 102, and corresponding bus grant lines, 46, 72, 78, 104, to individual bus units For purposes of explanation four such I/O device bus units are illustrated and referenced herein as Bus Units A-D. It should be understood that the present invention may comprise fewer or greater bus units. It should further be understood that both the IOQ element 30 and STIO element 32 are also considered as bus units for purposes of accessing and using the ADC bus 40.

ADC bus 40 consists of a 4-byte bi-directional data bus and a 4-bit bi-directional control bus. Each bus unit has a unique request line and grant line which are connected to IOQ element 30. Each bus unit which desires access the ADC bus activates a request signal which is provided to IOQ element 30. IOQ element 30 responds to the request signal by arbitrating between all requesting bus units and providing a grant signal to a requesting bus unit based upon a priority scheme implementing the least recently used (LRU) algorithm.

In FIG. 1, Bus Unit A comprises an I/O interface controller (IOIC) 42 which is coupled to ADC bus 40. IOIC 42 is also coupled by request line 44 and grant line 46 to IOQ element 30. IOIC 42 is coupled by a bi-directional data and control (SPD) bus 48 which couples IOIC 42 to a series of I/O processors (IOP) such as IOPs 50a and 50b. Each IOP is coupled to a respective I/O device. For example, IOP 50a is coupled by line 54a to IO device 52a.

Each IOP is an intelligent microprocessor based subsystem providing control of the I/O device attached to it. Each specific type of IOP is dedicated to a specific category of I/O devices such as a tape or direct access storage device (DASD), workstation or telecommunications device.

Each I/O device interfaces with IOCP 24 via an IOP and IOIC 42. IOIC 42 functions as an interface between the IOPs 50a and 50b and the IOCP 22. When one of the I/O devices in Bus Unit A seeks access of ADC bus 40, IOIC 42 generates a request signal which is provided on request line 44 to IOQ element 30. Should the IOQ element 30 grant the I/O device bus request, IOQ element 30 transits a bus grant signal on grant line 46 to IOIC 42. IOIC 42 communicates with the appropriate IOP and associated I/O device for permitting the requesting I/O device to access the ADC bus 40.

Bus Unit B is similar to Bus Unit A in that IOIC card 56 is coupled by SPD bus 58 to a series of IOP cards, IOPs 60a, 60b, etc. The IOPs 60a and 60b as illustrated are respectively coupled by lines 62a and 62b to respective I/O devices 64a and 64b. IOIC card 56 is positioned in a remote location from that of IOIC card 42. IOIC card 56, due to its remote location positioning is coupled an address/data/communication remote (ADCR) bus 66 to an extended remote bus interface (ERBI) card 68. ERBI card 68 is coupled to ADC BUS 40 and to IOQ element 30 by request line 70 and grant line 72. ERBI card 68, in essence, functions as a bus extension of ADC bus 40 to accommodate for the remote location of IOIC card 56.

Bus unit C is comprised of ERBI card 74 which is coupled to ADC bus 40 in addition to being coupled by request line 76 and grant line 78 to IOQ element 30. ERBI card 74 is also coupled by bi-directional address/data/communication extension (ADCE) bus 80 to a series of channel processor (CHP) 82a-82d. Channel processors 82a-82d are each coupled by respective bi-directional channel bus 84a-d to a corresponding I/O device 86a-86d CHP cards 82a-82d are intelligent microprocessor base subsystems, similar to the IOP cards, which provide control of the attached I/O device 86a-86d. In Bus Unit C, an I/O device requesting access to ADC bus 40 communicates such request via a corresponding CHP card 82 and ERBI card 74 to IOQ element 30, ERBI card 74 generates the request signal which is provided on line 76 to IOQ element 30. In response thereto, and according to the arbitration scheme, a grant signal is provided by IOQ element 30 on line 78 to ERBI card 74. ERBI card 74 provides a signal to the corresponding CHP card 82 to enable access to the requesting I/O device 86.

Bus Unit D is similar to that of Bus Unit C in that ERBI card 88 is coupled by an ADCE bus 90 to a series of CHP cards 92a-92d. Correspondingly, each CHP card 92A-92D is coupled by a respective channel bus 94a-94d to a respective IO device 96a-96d. ERBI card 88 is coupled by an ADCR bus 98 to ERBI card 100. ERBI card 100 is coupled to ADC bus 40 in addition to being coupled to IOQ element 30 by request line 102 and grant line 104.

The system illustrated in FIG. 1 further comprises a support processor (SP) apparatus 106 which is coupled by line 108 to support system adapter (SSA) 110. SSA 110 is coupled by line 112 to a primary clock maintenance (CLKMAINT) card 114 which is coupled by line 116 to SECMAINT apparatus 34 located on IOCP card 22. SECMAINT apparatus 34 is respectively coupled by lines 118, 120 and 122 to IOE element 28, IOQ element 30 and STIO element 32.

SP 106 may include an operator console which allows monitoring of system activity and performance of system maintenance. SP 106 may also provide system clock starting/stopping, machine state scanning and changing of individual latch values in the system as required. SP 106 is coupled through SSA 110 which is a local area network (LAN) interface. CLKMAINT card 114, in addition to the SECMAINT module 34, provide clock maintenance and control along with providing a communications path between SP 106 and IOCP card 22.

Bus Units A-D are but one exemplary embodiment of a series of bus units coupled to the IOCP card 22. It is to be understood that many variations in bus units may be realized.

Figure 2:
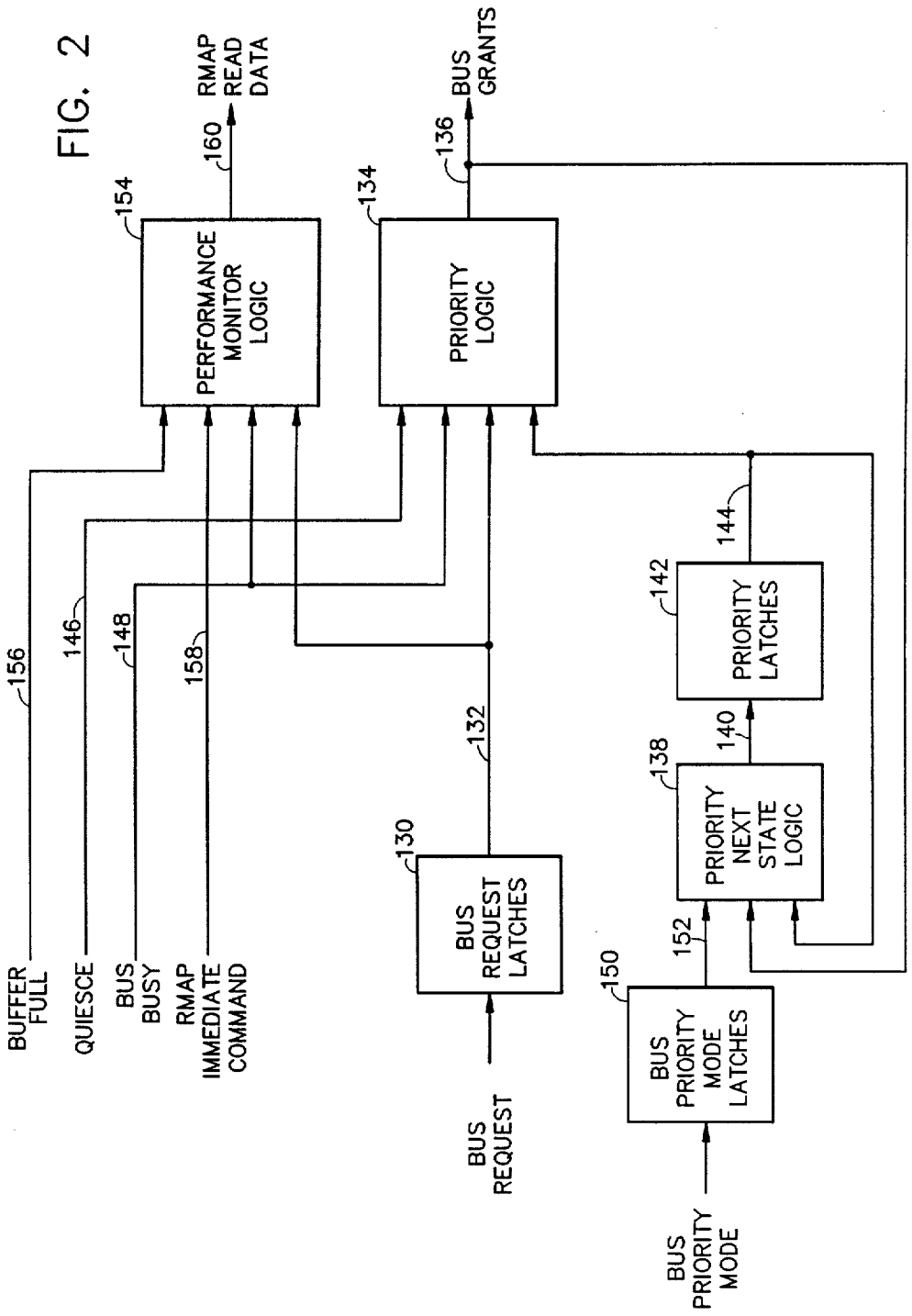
FIG. 2 illustrates in block diagram form the bus arbiter of the present invention.

Among the many functions which IOQ element 30 performs is bus arbitration. IOQ element 30 as configured implements a LRU algorithm in determining priority in granting access to the ADC bus by requesting bus units. FIG. 2 illustrates in block diagram form the bus arbiter of the present invention contained within IOQ element 30. The bus arbiter of the present invention comprises a series of bus requests latches 130 which receive and store bus request signals which represents the current request status. The stored request signals are provided on line 132 to the priority logic 134. Priority logic 134 generates the bus grant signals which are on line 136. Each bus grant signal is provided to the appropriate requesting bus unit in accordance with the priority algorithm.

The bus grant signals output on line 136 are also fed back as an input to priority next state logic 138. Priority next state logic 138 uses the bus grant signals to update the priority status for the following bus grant. Priority next state logic 138 generates a group of priority signals representative of the relative priority of each bus unit with respect to one another in a priority hierarchy. Priority next state logic 138 provides the group of priority signals on line 140 to priority latches 142 where the signals are stored. The stored priority signals are output from priority latches 142 on line 144 to an input of priority logic 134. The stored priority signals are fed back to an input of priority next state logic 138.

Priority logic 134 also receives the input signals QUIESCE and BUS BUSY, respectively, on lines 146 and 148. The signal QUIESCE is generated by logic in the IOQ element in response to an error condition or debug state to suspend arbitration. Similarly, the signal BUS BUSY is generated by the IOQ element when the bus is currently in use so as to suspend arbitration. The QUIESCE and BUS BUSY signals are used by priority logic 134 to form a STOP ARBITRATION signal used in the priority logic 134 as described below.

The arbitration algorithm selected for application in the bus arbitration scheme of the present invention is based on the least recently used (LRU) algorithm. The LRU algorithm utilizes a priority hierarchy which assigns the highest priority into the requesting bus unit that has not used the bus for the longest interval. The bus unit that has most recently used the bus is assigned the lowest priority. All bus units have a relative priority with respect to one another. Initially, all bus units are assigned a priority within the priority hierarchy.

In order to initiate a transfer on the bus, a bus unit activates its request signal. These signals are latched into the request latches 130 every cycle. The latched request is then fed to the priority logic 134. If quiesce and bus busy are not active, priority logic 134 generates a grant signal. If a single bus unit requests access to the bus, the requesting bus unit is granted access to the bus. If there is more than one request for the bus, the arbiter determines which request has the highest priority. The grant signal generated by priority logic 134 corresponds to the bus unit which has least recently gained access to the bus. After a grant signal is generated, priority next state logic 138 utilizes the grant signal to update priority latches 142. The status of priority latches 142 determine the priority of the bus units for the next bus grant signal.

The bus arbiter of the present invention further comprises a means for selectively changing the priority in bus grants by establishing two classes or modes of priority, i.e., high priority mode and low priority mode. Accordingly, priority mode signals are provided to priority mode latches 150 where the signals are stored. The stored priority mode signals are fed via line 152 to an input of priority next state logic 138. When two classes of priority are created, by selecting certain bus units in the high priority mode and other certain bus units in the low priority mode, the normal LRU algorithm is modified.

Bus units in the high priority mode operate under an LRU algorithm with respect to other bus units in the high priority mode. Similarly, bus units in the low priority mode operate under the LRU algorithm with other bus units in the low priority mode. When only a single bus unit, either high or low priority modes requests the bus, the arbiter grants the requesting bus unit access to the bus. Upon granting of the bus to the requesting bus unit, the bus arbiter is updated so as to assign the bus unit granted the bus the lowest priority of the bus units in that particular priority mode. When bus units of both high and low priority mode are requesting the bus, the high priority mode requesting bus unit is granted the bus, even when the high priority mode bus unit has more recently been granted the bus than the low priority mode requesting bus unit. Upon grant, the high priority mode bus unit which is granted the bus is assigned a lowest relative priority in access to the bus among high priority mode bus units. Once all high priority mode bus unit requests have been granted, the low priority mode bus unit requests may be granted.

It is a further feature of the present invention to provide a means for monitoring the status of the bus unit requests by selectively sampling the bus request signals as latched and output by bus request latches 130. The output of bus request latches 130 is provided on line 132 to an input of performance monitor logic 154. The BUS BUSY signal on line 148 and a BUFFER FULL signal, provided from STIO element on line 156, are also input to performance monitor logic 154. The BUFFER FULL signal provides a status of the STIO buffers The bus request signals along with the BUS BUSY and BUFFER FULL signals are sampled and read out of performance monitor logic 154 in response to rapid maintenance access path (RMAP) command signals. The RMAP command signals are provided on line 158 to performance monitor logic 154. The monitored status data is output from performance monitor logic 154 on line 160 as the RMAP read data. The RMAP commands are typically provided via the support processor with the RMAP read data provided to the support processor for monitoring purposes. Evaluation of the RMAP read data is to determine bus usage. Furthermore, the RMAP read data may be utilized in determining bus unit priority mode status for allocation of bus bandwidth between requesting bus units.

Figure 3:
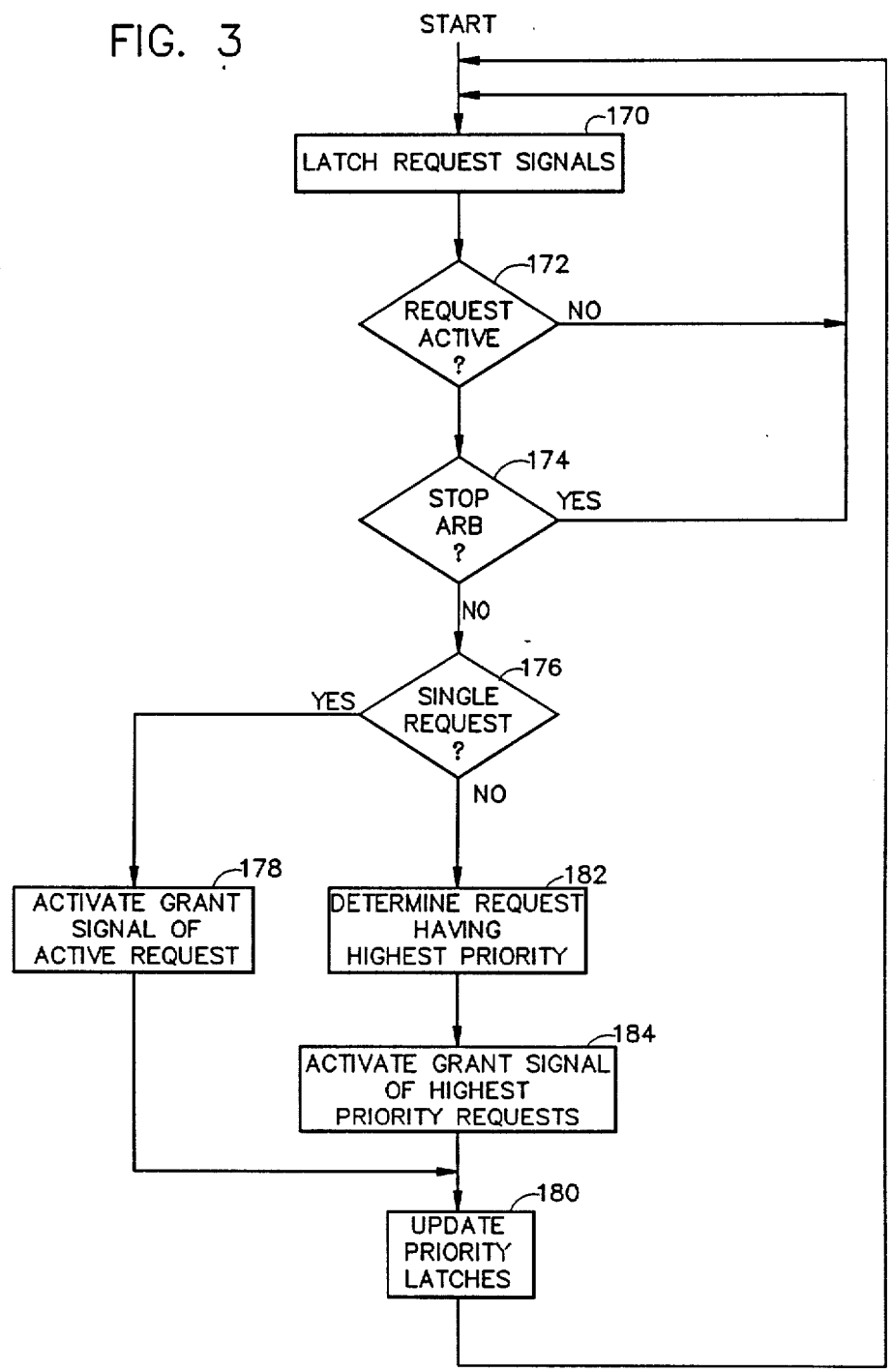
FIG. 3 is a flow chart showing the various steps of operation of the bus arbiter.

FIG. 3 is a flow diagram illustrating the steps of bus request arbitration in the bus arbiter of the present invention which utilizes the LRU algorithm. It should be noted that the description of the operational steps of FIG. 3 include reference to the elements of FIG. 2 for purposes of clarity with respect to the operation description. Each IOCP card clock cycle the bus unit request signals are latched (block 170) in the bus request latches 130. If there are no bus requests, no further activity is performed by the bus arbiter in the present cycle latched request status (block 172). During the next cycle the request status is monitored with any requests during this cycle latched (block 170) in the bus request latches 130.

If one or more bus units are requesting access to the bus, the active request signals are latched (block 170) and detected (block 172) by priority logic 134. If during current cycle, request activity is detected and the $\overline{\text{STOP ARBITRATION}}$ signal is inactive (block 174), arbitration is halted and no further activity is performed with respect to the current cycle request status. During the next clock cycle, the bus unit request signals are again latched (block 170), with the request active determination made (block 172) and with an active request status existing, the stop arbitration determination (block 174) is made. If during this cycle the $\overline{\text{STOP ARBITRATION}}$ signal is active, the arbitration process continues. At this point, the bus arbiter determines whether or not there is a single or multiple bus units requesting access to the bus (block 176).

If a single bus unit is requesting access to the bus, a grant signal corresponding to the requesting bus is activated (block 178). Upon granting the single requesting bus unit access to the bus, the priority latches 142 are updated (block 180) by next state priority logic 138. Upon updating at the priority latches 142, priority logic 134 is ready for making a determination of further granting of bus requests by latching the bus unit requests (block 170). Should multiple bus units request access to the bus be determined (block 176), a determination is made of the bus unit requester having the highest priority (block 182). A grant signal corresponding to the requesting bus unit having the highest priority is then granted (block 184). Upon generating the bus grant signal, priority latches 142 are updated (block 180) by the priority next state logic 138. Upon updating of priority latches 142, priority logic 134 is again ready to process the subsequent cycle bus request status.

FIG. 5a–5h illustrate in schematical form an exemplary implementation of the bus arbiter of the present invention which utilizes an LRU algorithm. The arbiter as illustrated further includes programmable bus unit priority mode and bus performance monitoring features. As illustrated in FIGS. 5a–5h, the arbiter, for purposes of illustration, is configured for arbitrating between four bus units. Based upon the teachings provided herein, the bus arbiter may be readily configured for arbitration of more or less bus units.

Preferably, the specific circuitry hereinafter described is based upon level sensitive scan design (LSSD) circuitry. In this regard, the basic circuit unit is a shift register latch (SRL) containing two latching elements, referred to as L1 and L2, respectively. Once such SRL is indicated by the reference numeral 190 in FIG. 5a. Ports D and C of the L1 element are used respectively for data and clock inputs to the SRL. The L2 element has a data input internally connected to the L1 element output and uses the B input for clocking of data into the L2 element. In a latch-trigger design, the B input is also used for the trigger clock, which provides the main timing sequence in this invention. Each SRL is fed a clock signal consisting of two clock waveforms $C_1$ and $C_2$, such as those illustrated in the timing diagram of FIG. 6. Data presented to the D input of the L1 element enters the L1 element while the $C_1$ clock waveform has a positive level. The data is latched or retained in the L1 element at the rising edge of the $C_1$ clock waveform. The data retained within the L1 element is available from the output of the L1 element at the rising edge of the $C_2$ waveform. The data in the L2 element is thus available as the SRL output until the next rising edge of the $C_2$ clock waveform. The fundamental operation cycle ("the machine cycle") of the processor in which the invention operates is defined by the period between successive rising edges of the $C_2$ clock waveform.

Figures 5A, 5B:
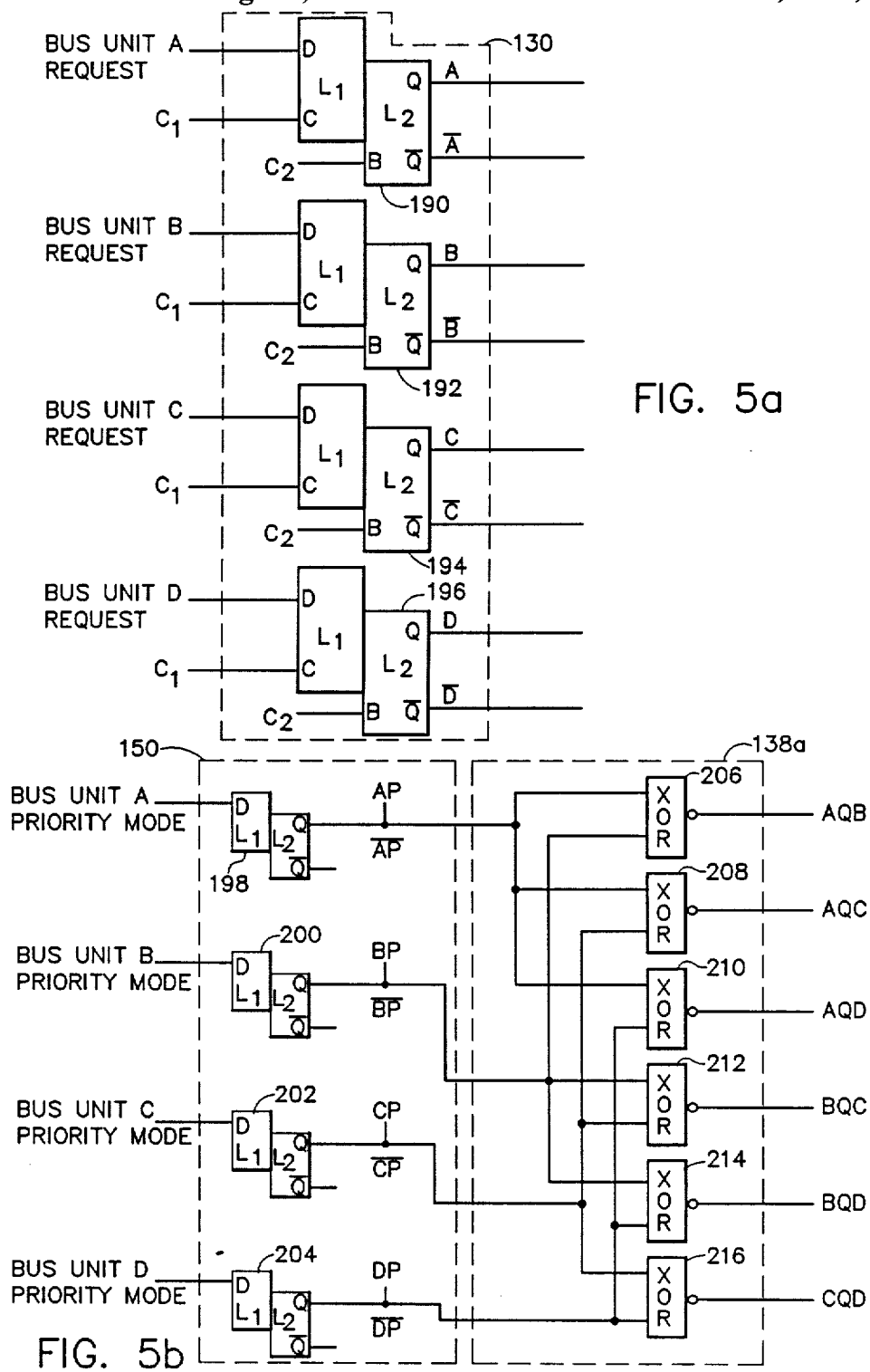
FIGS. 5A-5H illustrate, in schematic form, a specific circuit implementation of a bus arbiter using a least recently used algorithm and having priority mode and performance monitoring capabilities.

FIG. 5a illustrates bus request latches 130 which is comprised of a series of SRL's 190, 192, 194 and 196. Each SRL 190, 192, 194 and 196 is configured to receive at the L1 element D input thereof a bus request signal respectively from bus unit A, bus unit B, bus unit C, and bus unit D. The input to SRL 190, 192, 194 and 196 is indicative of the current bus unit request status. The output from each $L_2$ element is the latched bus request signal and its inverse, for example, the signal A and $\overline{A}$ respectively provided at the SRL Q and $\overline{Q}$ outputs. The output from each bus request latch or SRL 190, 192, 194, and 196 is provided to the priority logic 134.

For purposes of simplicity in illustration, the SRL's in FIGS. 5b–5h are illustrated without the clock input signals. It should be understood that each of these SRL's are identical to those illustrated in FIG. 5a. It should be further understood that when a signal is active it is in a logical "1" state. Correspondingly, when a signal is inactive, it is in a logical "0" state. With further reference to the SRL's, when an SRL is set, the SRL data stored in the SRL is provided at the Q output is an active signal in a logical "1" state. Correspondingly, when the SRL is reset, the data stored in the SRL and provided at the $\overline{Q}$ output is an inactive signal in a logical "0" state.

FIG. 5b illustrates bus priority mode latches 150 Which is comprised of a series of SRL's 198, 200, 202 and 204. Each SRL 198, 200, 202 and 204 is configured to receive a priority mode signal corresponding to the priority mode, i.e., high or low, of a corresponding bus unit. The priority mode latches 150 may be set or reset by the user, such as through SP 106. Each SRL 198, 200, 202 and 204 provides as an output the corresponding latched priority mode signal and its inverse. SRL 198 provides the latched priority mode signal for bus unit A as the signal AP and the inverse thereof as the signal $\overline{AP}$. Similarly, SRL's 200, 202 and 204, respectively latch the priority mode signals for bus units B, C and D, so as to provide as an output the latched priority mode signals and the respective inverses signals thereof as BP and $\overline{BP}$, CP and $\overline{CP}$, and DP and $\overline{DP}$.

Each latched priority mode signal and its inverse are provided to priority next state logic/138. In particular, the latched priority mode signals AP, BP, CP, and DP are provided to a priority feedback logic first stage 138a which is comprised of a series of exclusive NOR gates 206, 208, 210, 212, 214, and 216. Exclusive NOR gates 206–216 are used to perform an equals compare of all combinations of the latched priority mode signals. The latched priority mode signal AP is output to Exclusive NOR gates 206, 208, and 210. The latched priority mode signal BP is output to Exclusive NOR gate 206, 212, and 214. Similarly, the latched priority mode signal CP is output to Exclusive NOR gates 208, 212, and 216, while the priority mode signal DP is output to Exclusive NOR gates 210, 214, and 216. Exclusive OR gates 206–216, respectively provide the equals compare signals AQB, AQC, AQD, BQC, BQD, and CQD.

When a bus unit is placed in the high priority mode, its bus priority mode latch signal is set active which sets the corresponding SRL which provides a Q output signal in the logical "1" state. Correspondingly, when the bus unit is placed in a low priority mode, the corresponding SRL is reset and provides a Q output signal in the logical "0" state. When both latched priority mode signals input to the Exclusive NOR gate are at a logical "0" state, indicative of both bus units set in a low priority mode, the output of the Exclusive NOR gate is a signal in a logical "1" state. Similarly, when both latched priority mode signals input to the Exclusive NOR gate are at logical "1" state, indicative of both bus units set in a high priority mode, the output of the Exclusive NOR gate a signal in a logical "1" state. A signal output from the Exclusive NOR gate in a logical "1" status is thus indicative of equal priority among the compared bus units. However, if the latched priority mode signals input to the Exclusive NOR gate are each at a different logic level, the signal output from Exclusive NOR gate is in a logical "0" state. A signal output from the Exclusive NOR gate in a logical "0" state is indicative of inequality in priority among the compared bus units.

The signals output from the priority feedback logic first stage 138a are provided along with the outputs from the priority mode latches 150 to portions of the priority feedback logic second stage portions 138B, 138C, and 138D. Priority feedback logic second stage along with the priority logic is illustrated in FIGS. 5c-5f. The circuitry illustrated in FIGS. 5c-5f is utilized to grant the bus grant signals respectively to bus units A-D.

Figure 5C:
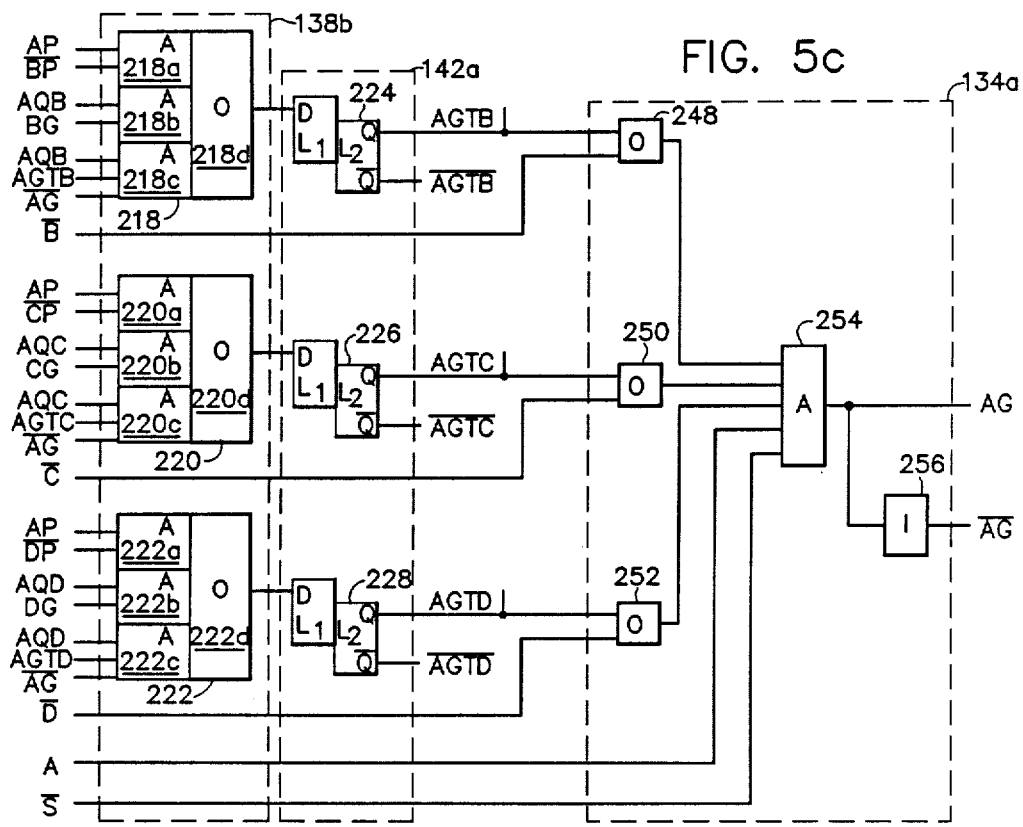

Referring to FIG. 5c, priority feedback logic second stage portion 138b is comprised of AND/OR (AO) logic gate books 218, 220, and 222. The output of AO logic gate books 218, 220, and 222 are coupled to priority latch portion 142a respectively at the input of priority latches or SRL's 224, 226, and 228. The respective output of each SRL's 224, 226, and 228 are the signals AGTB, AGTC and AGTD which represent the status of priority of bus unit A with respect to bus units B, C, and D. When SRL 224 is set, the output signal AGTB is at a logical "1" state which satisfies the condition that bus unit A is greater in priority than bus unit B. However, when SRL 224 is reset, the signal AGTB is at a logical "0" which is indicative of the condition that bus unit B is of a higher priority than bus unit A. In a similar manner, SRL's priority latches 226 and 228 respectively indicate the status in priority of bus unit A with respect to bus units C and D.

The top AND gate of AO logic gate books 218, 220, and 222, (AND gates 218a, 220a and 222a) are utilized to compare the priority mode of bus unit A with each respective bus unit. Upon detection of the condition of bus unit A is a high priority mode bus unit, indicated by the signal AP being a logical "1" with the compared bus unit of a low priority mode, indicated by the compared bus unit priority mode inverse signal $\overline{BP}$, CP and DP being a logical "0", the respective AO logic gate book 218, 220, and 222 sets the corresponding SRL 224, 226, and 228.

AND gates 218b, 220b, and 222b respectively receive the comparison signals AQB, AQC, and AQD in addition to respectively receiving the bus grant signals BG, CG, and DG from the output of priority logic 134. When the output from the corresponding Exclusive NOR gate in priority feedback logic first stage 138a is at a logical "1" and the compared bus grant signal is also at a logical "1" state, the corresponding priority SRL 224, 226 and 228 in priority latch portion 142A is set. A logical "1" at the Q output of SRL 224, 226 or 228 is indicative of bus unit A having a greater priority than the compared bus unit.

AND gate 218C also the signal AQB from exclusive NOR gate 206, in addition a feedback signal from SRL 224 in the form of the AGTB signal along with the inverse of the bus unit A grant signal, $\overline{AG}$. AND gate 218C is utilized to maintain the state SRL 224 when the signal AQB is a logical "1", and the bus unit A grant has not been activated, i.e., the signal AG is a logical "0". Similarly, AND gates 220C and 222C are utilized to maintain the state of respectively of SRL's 226 and 228.

Priority latches 142 is configured such that all pairwise combinations of requesters are considered, i.e., the result of a comparison in relative priority among all pairs of requesting bus units. Each individual priority latch indicates whether a given requester is higher or lower in priority than the other requester. In the circuit implementation illustrated in FIGS. 5a-5h, four such requesters are indicated and are labeled bus units A, B, C, and D. It is not necessary that all four of bus unit A, B, C and D be external card based I/O devices. Two of the bus units are the IOQ element and STIO element which are also capable of requesting access to the ADC bus.

In the description herein, the greater than operator (>) will be used to indicated that a given bus unit is higher in priority than other bus unit. For example, the expression A>B=true indicates that requester A is of a higher priority than requester B. For four requesters the following relationships must be considered: A>B, A>C, A>D, B>C, B>D, and C>D. In order to represent all combinations for the given example, six priority latches are required, with each latch storing a valve representing the result of a respective one of the above relationships. Each latch may be reset to a logic "0" or set to a logical "1" state. If a latch is set in the logic "1" state, then the corresponding condition is true. If a latch is reset in the logical "0" state, then the corresponding condition is false. For example, if the latch which represents the condition A>B is in the logical "1" state, then the condition A>B=true which is indicative that requester A is higher in priority than requester B.

Utilizing the least recently used algorithm, the priority latches are updated after a grant signal is activated. The bus unit that is given the grant becomes lowest in priority. All other bus units become higher in priority than the unit most recently granted the bus. The priority latches are updated to reflect these greater than conditions if the bus unit on the left side inequality has been granted the bus, then the latch is reset, i.e. a logical "0" state. If the bus unit on the right side of the inequality has been granted the bus, then the latch is set, i.e., logical "1" state. If the bus unit on the left side of the inequality has not been granted the bus, then the latch holds its present state. For example, after bus unit A is granted the bus, the (A>B) latch must be reset to the logical "0" state to satisfy the condition A>B=false. After bus unit B is granted the bus, the (A>B) must be set to the logical "1" state to satisfy the condition A>B=true.

FIG. 4 illustrates the dynamic update of arbiter priority latches over time, when all bus unit requests are active, i.e., logical "1" state. At time T0, at the initial state of the arbiter, bus unit A is highest in priority followed by bus units B, C, and D in descending order. At time T1 bus unit A is given a grant. At time T2 the new state of the priority latch is established with bus unit B now having the highest priority followed by bus units C, D, and A in descending order. At time T3, bus unit B is granted the bus. At time T4, the new state of the priority latches is established with bus unit C having the highest priority followed by bus units D, A, and B in descending order. At time T5, bus unit C having the highest priority is granted the bus. At time T6 the priority latches are updated with the new state of the priority latches indicating that bus unit D is now in the highest priority followed by bus units A, B, and C in descending order. At time T8, the priority latches are updated and illustrate the new state of the priority latches which is the same as time TO.

The priority mode latches are utilized to alter the normal LRU priority. A mode latch is associated with each bus unit and when it is reset in the logical "0" state, the corresponding bus requester is in a low priority mode. When the mode latch is set in the logical "1" state, the corresponding requester is in a high priority mode. If a high priority requester requests the bus, all low priority requests will be ignored If more than one high priority requester requests the bus or if only low priority requesters request the bus, then the normal LRU algorithm will be used to grant the bus within the corresponding priority mode. Priority next state logic 138 for priority latches 142 either set or reset the priority latches to enforce the these conditions.

Figure 5D:
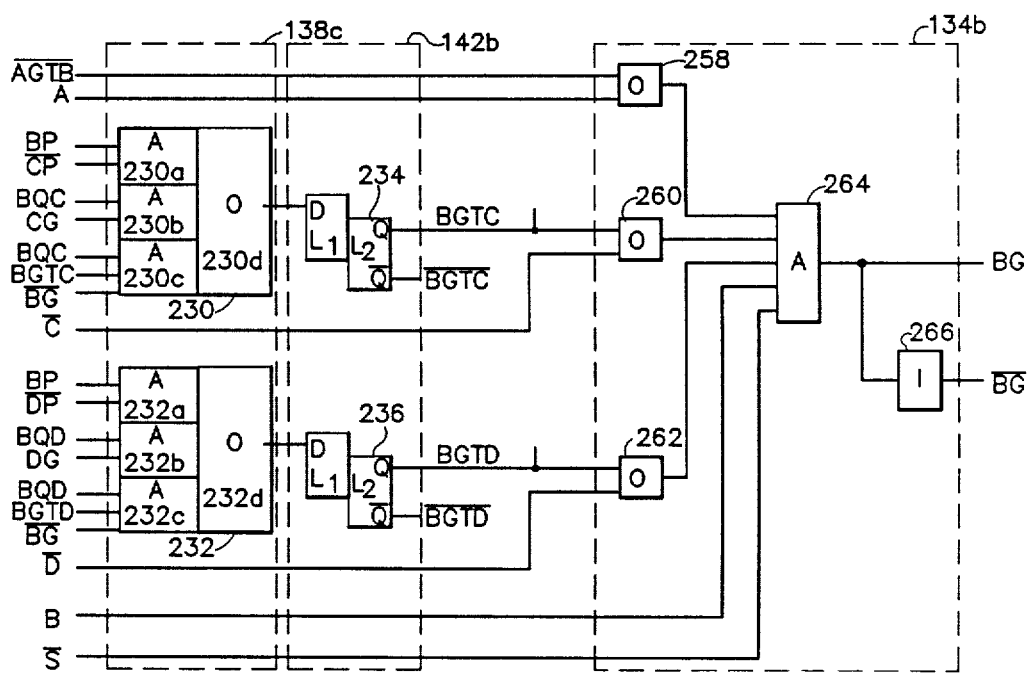

FIG. 5D illustrates the bus unit B grant logic. In FIG. 5d, priority next state logic second stage 138c is comprised of AO logic gate books 230 and 232. The output of AO logic gate books 230 and 232 are respectively provided to priority latch portions 142B respectively at the input of priority latches or SRLS 234 and 236. In AO logic gate book 230, AND gate 230a receives the signals BP and CP from priority mode latches 150 to detect a condition where bus unit B is set in a high priority mode and bus unit C is not. In this condition, priority latch or SRL 234 of priority latch portion 142b is set with the output signal BGTC being a logical "1" state. Similarly, AND gate 232A also receives the signals BP and $\overline{DP}$ to detect the condition of bus unit B being in a high priority mode and bus unit D is not. In this condition, AO logic gate book 232 sets SRL 236 with the signal BGTD being in a logical "1" state.

AND gate 230b receives the signal BQC along with the bus unit C bus grant signal CG. With the signals BQC and CG being in a logical "1" state, respectively indicative of bus unit B being of the same priority mode as bus unit C and bus unit C being given a bus grant signal, AO logic gate book 230 sets SRL 234 with the signal BGTC being in a logical "1" state. Similarly, AND gate 232b receives the signal BQD along with the bus unit D bus grant signal DG. With the signals BQD and DG being in a logical "1" state, respectively indicative of bus unit B being of the same priority mode as bus unit D and bus unit D being given a bus grant signal, AO logic gate book 232 sets SRL 236 with the signal BGTD being in a logical "1" state.

AND gate 230c receives the signals BQC, BGTC along with the signal $\overline{BG}$ to maintain SRL 234 in its present state, provided bus unit B is not being given a bus grant signal (BG active) and the equals detect Signal BQC is active. Similarly, AND gate 232c receives the signals BQD, BGTD along with the signal BG to maintain SRL 236 in its present state, provided bus unit B is not being given a bus grant signal (BG active) and the equals detect signal BQD is active.

Figure 5E:
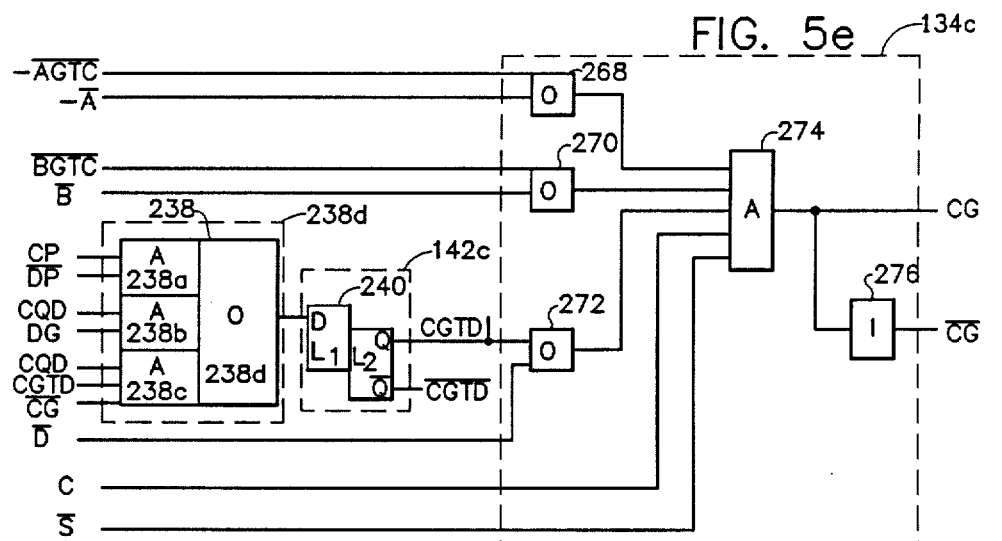

FIG. 5e illustrates the bus unit C grant logic. In FIG. 5e, the priority next state logic second stage 238d is comprised of AO logic gate book 238. AO logic gate book 238 has an output coupled to priority latch portion 142C, which is comprised of SRL 240. AND gate 238a receives the signals CP and $\overline{DP}$ to detect the condition where bus unit C being set in a high priority mode and bus unit D is set in a low priority mode. When this condition occurs, AO logic book 238 sets SRL 240 with the output signal CGTD being in a logical "1" state. AND gate 238b detects the condition of bus unit C and D both being of an equal priority mode and a grant signal being provided to bus unit D. In this condition, AO gate 238 sets SRL 240 with the signal CGTD being in a logical "1" state. AND gate 238c is used to hold SRL 240 at its present state, provided bus unit C grant is not being given a bus grant signal ($\overline{CG}$ active) and the equals detect signal CQD is active.

Figure 5F:
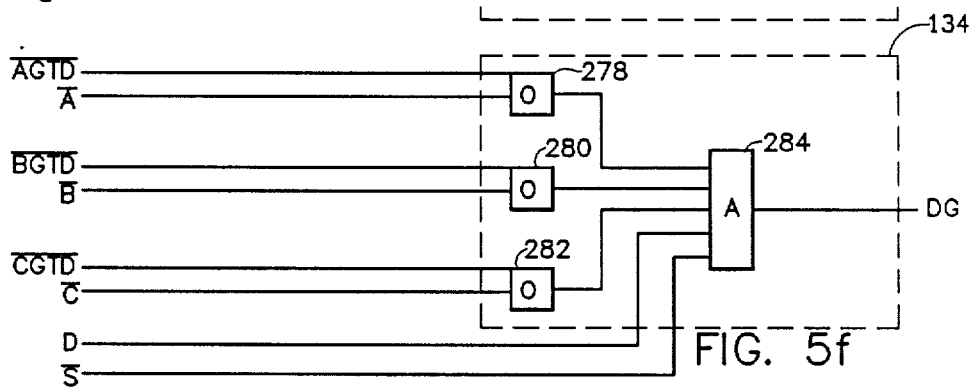

FIG. 5f illustrates the bus unit D grant logic. Due to logic configuration with respect to FIGS. 5A–5e, all priority signals are generated with respect to bus unit D. In FIG. 5F, bus unit D priority signals are provided directly to priority logic portion 134B.

Figure 5G:
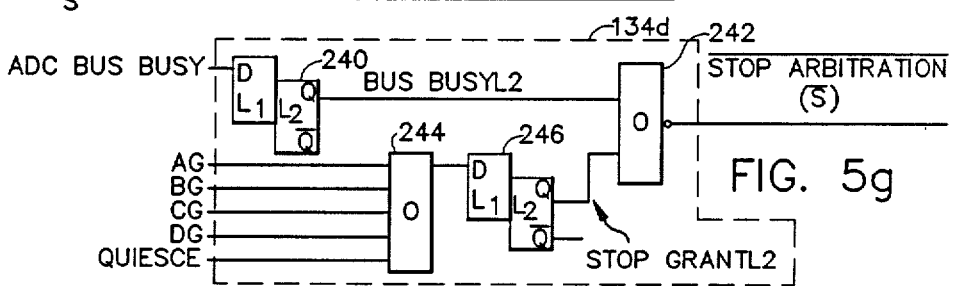

FIG. 5g illustrates the circuitry in priority logic portion 134e which generates the $\overline{\text{STOP ARBITRATION}}$ signal, i.e., $\overline{S}$ signal. With reference to FIG. 5g, the $\overline{S}$ signal is used to enable or suspend arbitration. The stop arbitration logic includes SRL latch 240 which latches the BUS BUSY signal. The BUS BUSY signal provided SRL 240 by the IOQ element when the ADC bus is active with control signals or data being transferred between bus units. The latched BUS BUSY signal is the signal BUS BUSYL2 which is driven to NOR gate (242). The bus grant signals AG, BG, CG, and DG from priority logic 134, along with the QUIESCE signal are input to OR gate 244. The output of OR gate 244 is latched in SRL 246. The output of SRL 246 is provided as the STOP GRANT L2 signal to the other input of NOR gate 242. When one of the bus grant signals or the QUIESCE signal is at a logic "1" state, the $\overline{S}$ signal goes to the logic "0" state for suspending arbitration in the priority logic 134. When the $\overline{S}$ signal is active, priority logic 134 is enabled for the arbitration process.

The portion of priority logic 134 responsible for generating the bus unit A grant signal (AG) is illustrated in FIG. 5c within priority logic portion 134a. In priority logic portion 134a the grant signal AG is generated in two stages. The first stage is comprised of three OR gates 248, 250, and 252. One input of OR gate 248 receives the AGTB signal from the Q output SRL 224. The other input of OR gate 248 receives the signal $\overline{B}$ from the $\overline{Q}$ output of SRL 192. Similarly, OR gate 250 receives the AGTC signal from the Q output of SRL 226, while the other input receives the signal $\overline{C}$ from the $\overline{Q}$ output of SRL 194. OR gate 252 has an input coupled to the Q output of SRL 228 to receive the AGTD signal, with the other input of OR gate 252 for receiving the $\overline{D}$ signal from the $\overline{Q}$ output of SRL 196.

The output of OR gates 248, 250 and 252 are respectively coupled as inputs to AND gate 254. AND gate 254 also has an input connected to the Q output of SRL 190 to receive the signal A. AND gate 254 also has an additional input for receiving the $\overline{S}$ signal.

In order for the AG signal to be active, each of the inputs to AND gate 254 must be active, i.e., in a logical "1" state. The AG signal will be active if there are no other active requests other than a bus unit A request, or if multiple requests are active the corresponding greater than condition is true, i.e., the signals AGTB, AGTC, and AGTD are at a logical one state. However, with either a bus unit A request alone or with additional bus unit requests, the latched request signal A along with the signal $\overline{S}$ must be active in order for the bus unit A grant (AG) signal to be active. The output of AND gate 254 is also coupled to the input of inverter 256 which provides the inverted bus unit A grant ($\overline{AG}$) signal which is fed back to priority next state logic 138B.

Priority logic portion 134b comprises OR gates 258, 260, and 262 each having an output coupled to an input of AND gate 264. The inputs to OR gate 258 are respectively coupled to the $\overline{Q}$ output of SRL 224 and the $\overline{Q}$ output of SRL latch 190 for respectively receiving the signals $\overline{AGTB}$ and $\overline{A}$. OR gate 260 has one input coupled to the Q output of SRL 234 for receiving the BGTC signal while the other input of OR gate 260 is coupled to the $\overline{Q}$ output of SRL 194 for receiving the $\overline{C}$ signal. Similarly, OR gate 262 has one input coupled to the Q output of SRL 236 for receiving the BGTD signal, while the other input of OR gate 262 is coupled to the $\overline{Q}$ output of SRL 196 for receiving the $\overline{D}$ signal.

The 5 inputs to AND gate 264 are respectively connected to the outputs of OR gates 258, 260 and 262. An additional input of AND gate 264 is connected to the Q output of SRL latch 192 for receiving the latched bus unit B signal B. Another input of AND gate 264 is for receiving the $\overline{S}$ signal. The output of AND gate 264 provides the bus unit B grant (BG) signal which is active when all inputs to the AND gate 264 are also active. The output of AND gate 264 is also coupled through inverting gate 266 to provide the inverted bus unit B grant signal $\overline{BG}$ to next state priority logic portion 138c.

In priority logic portion 134c, OR gates 268, 270, and 272 each have an output coupled to the input of AND gate 274. The inputs to OR gate 268 are $\overline{AGTC}$ and $\overline{A}$, derived, respectively from latch 226 and SRL 190. The OR gate 270 receives inputs from latch 234 and SRL 192. The OR gate 272 receives the $\overline{D}$ input from SRL 196. Last, the OR gate 272 is also fed CGTD from latch portion 142c. The AND gate 274 also receives the signal C from SRL 194 and $\overline{S}$. The AND gate 274 combines its input signals to generate the bus unit C grant (CG) signal, when those inputs are active. CG is inverted through an inverter 276 connected to the output of the AND gate 274.

Priority logic portion 134d comprises OR gates 278, 280, and 282 each having an output coupled to an input of AND gate 284. The inputs to OR gate 278 are coupled to the $\overline{Q}$ output of SRL 228 and the $\overline{Q}$ output of SRL latch 190 for respectively receiving the $\overline{AGTD}$ and $\overline{A}$ signals. OR gate 280 has one input coupled to the $\overline{Q}$ output of SRL 236 for receiving the $\overline{BGTD}$ signal, while the other input of OR gate 260 is coupled to the $\overline{Q}$ output of SRL 192 for receiving the B signal. Similarly, OR gate 282 has one input coupled to the $\overline{Q}$ output of SRL 240 for receiving the $\overline{CGTD}$ signal while the other input of OR gate 282 is coupled to the $\overline{Q}$ output of SRL 194 for receiving the $\overline{C}$ signal.

Additional inputs to AND gate 284 are respectively connected to the Q output of SRL latch 196 and the output of NOR gate 242 for respectively coupling the latched bus request signal D and the signals $\overline{S}$ to AND gate 284. The output of AND gate 284 provides an active bus unit D grant signal DG when all inputs to AND gate 284 are active.

Figure 6:
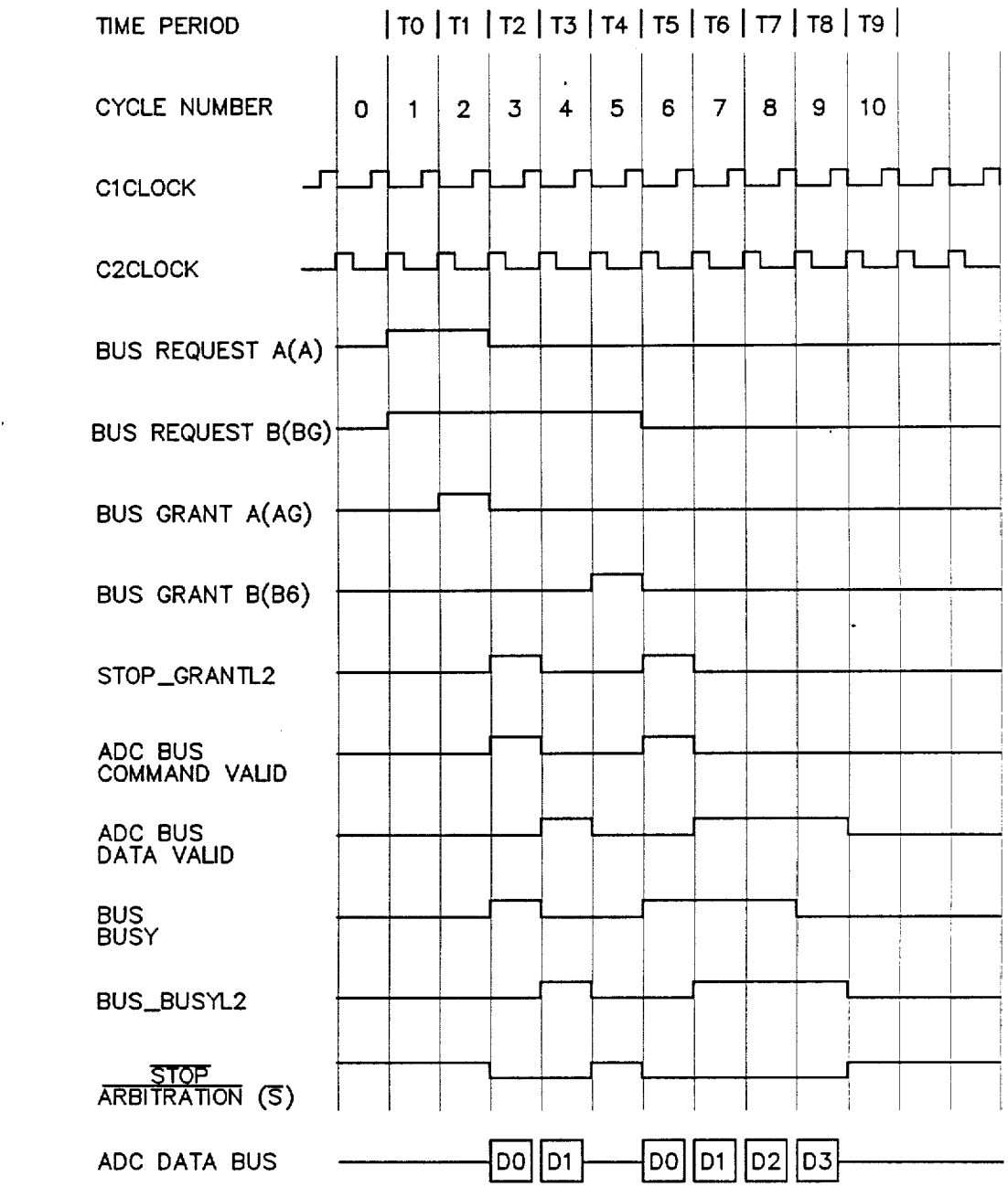
FIG. 6 is an exemplary timing diagram illustrating the arbitration of bus requests.

FIG. 6 is an exemplary timing diagram of the arbitration process. During cycle number 0, the bus units A and B latched request signals A and B are inactive. However, the arbiter with the $\overline{STOP\ ARBITRATION}$ signal $\overline{S}$ is active so as to place the arbiter in condition to arbitrate requests for the ADC bus.

During cycle number 1, bus units A and B, have requested the bus with active request signals A and B each latched by a respective bus request latch. In cycle number 2, a bus grant signal is generated for bus unit A with the AG signal being active. Once granted access to the bus, but unit A drives the ADC control bus signals command valid, data valid, and busy in the following manner. At the end of cycle number 2 the signals A and AG become inactive while the signal B remains active. The signal $\overline{S}$ also goes inactive to suspend arbitration of pending bus requests.

During cycle number three, the ADC BUS COMMAND VALID signal is driven active and indicates that the ADC bus has a valid command (D0). In addition, the ADC BUS BUSY signal is driven active and indicates that the ADC bus is in use. During cycle number 3, the BUS BUSY signal, active in cycle number 2 drives Bus Busy L2 signal active. Similarly, the STOP GRANTL2 line goes active in response to the grant signal AG signal being active in cycle number 2. At the end of cycle number 3, the BUS BUSY and corresponding STOP GRANTL2 signal, along with the ADC BUS COMMAND VALID signals go inactive.

During cycle number 4, the ADC BUS DATA VALID signal is driven active which indicates that the ADC bus has valid data (D1). In addition, the BUS BUSYL2 line goes active in response to the latching of the active ADC BUS BUSY signal during the previous cycle. The STOP GRANTL2 line goes active in response to the grant signal AG signal being active in cycle number 2. During cycles numbers three and 4, the arbiter performs a logic OR of the latched bus grants, i.e., the STOP GRANTL2 signal and the latched ADC bus busy signal, i.e., BUS BUSYL2 signal, to drive the $\overline{STOP\ ARBITRATION}$ signal $\overline{S}$ inactive and thus suspend arbitration.

As seen in the timing diagram of FIG. 6, the BUS BUSY signal is driven inactive for the last cycle of use of the bus by the granted bus user. This action is to prepare the arbiter for the next arbitration process. During cycles three and four, bus unit A transfers command and data on the ADC bus as indicated by the ADC data bus line.

During cycle numbers 1–5, the bus unit B bus request remains latched in the corresponding bus request latch. During cycle number 5, with the $\overline{S}$ signal active, arbitration is again enabled with a grant of access to the ADC bus going to bus unit B. The bus unit B grant signal B goes active. Cycle number 5 is essentially "dead" cycle on the bus. The "dead" cycle is required for shared buses utilizing CMOS technology to allow for high impedance settling time. By using the "dead" cycle on the bus to generate the grant signal for the next bus transaction, no penalty is incurred by the arbitration process with respect to the shared bus. During the period of cycle numbers 6–9 the signal $\overline{S}$ goes inactive to suspend arbitration activity while command and data are transferred on the ADC bus.

Figure 7:
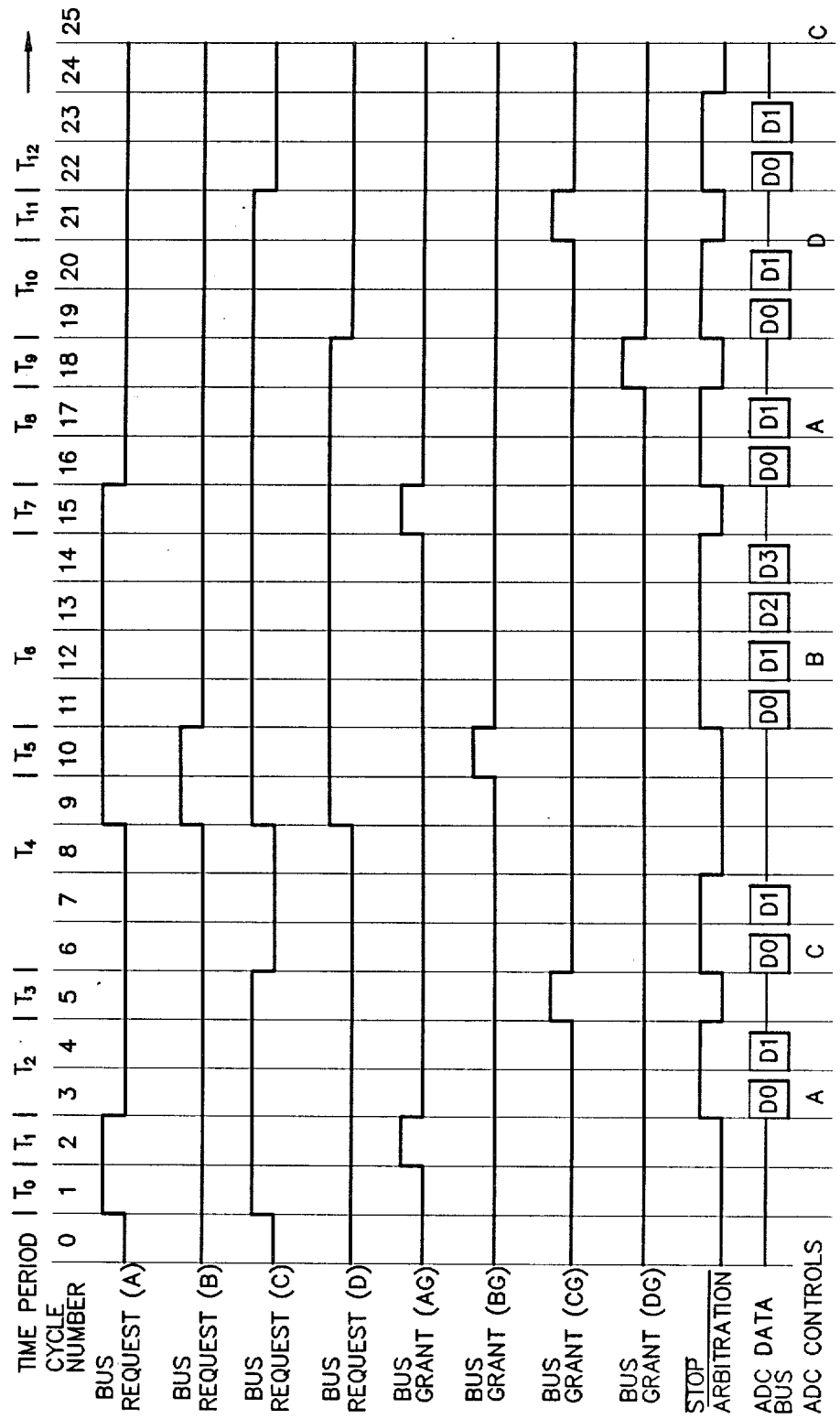
FIG. 7 is an alternate exemplary timing diagram illustrating the arbitration of bus requests.

FIGS. 7 and 8 respectively illustrate another exemplary timing diagram and corresponding arbiter state table for an LRU bus arbitration sequence modified by bus units in different priority modes. For this example, bus units A and B are set in the high priority mode by setting the respective bus priority mode latches active while the bus units C and D priority mode latches are reset inactive. During cycle number 0, there are no bus requests latched in the bus request latches and the $\overline{STOP\ ARBITRATION}$ signal $\overline{S}$ is active to permit request arbitration when received. The initial priority of the bus units in the high priority mode has bus unit A higher in priority than bus unit B, while bus units in the low priority mode has bus unit C higher in priority than bus unit D.

During cycle number 1, which corresponds to the time period T0, bus unit A and bus unit C request latches latch and active latched in the respective bus request latches indicative of bus requests by bus units A and C. During cycle number 1, with bus unit A being in a high priority mode and bus unit C in a low priority mode, the arbiter ignores the low priority mode request and grants the high priority mode requester a bus granting the following cycle, i.e., cycle number 2. In cycle number 2, the bus grant A signal AG goes active so as to grant the bus unit A access to the bus. At the end of cycle number 2, the latched bus request for bus unit A goes inactive. However, the latched bus unit C request signal C remains active as an indication that bus unit C is still requesting access to the bus.

During cycle numbers 3 and 4, i.e., time period T2, the arbiter is updated with bus unit A having a lower priority than bus unit B. However, since bus unit A is in a high priority mode, bus unit A remains of a higher priority than bus units C and D. Also during this period, the inverse stop arbitration signal ($\bar{S}$) signal changes to a logical "zero" thus suspending the generation of a grant signal until it goes active. Also during the time period T2 bus unit A utilizes the ADC bus for command and data transfer. At the end of cycle number 4, data transfer completed on the ADC bus, the inverse stop arbitration signal $\bar{S}$ goes active to enable a bus grant to be output to a requesting bus unit. When the signal $\bar{S}$ at the end of cycle number 4, bus unit C which has maintained an active request signal C is granted a bus granted a bus grant during cycle number 5. During cycle number 5, time T3, the bus unit C grant signal goes active. During cycle numbers 6 and 7, command and data is transferred on the ADC data bus while the arbiter updates in priority bus units. When command and data is being transferred on the ADC bus, the signal $\bar{S}$ is inactive until the transfer is completed, such as at the end of cycle number 7. With bus unit C last requesting the bus, bus unit C is of a lower priority than bus unit D. This assignment in priority among the low priority mode bus units has no effect on the priority of bus units A and B, which are in the high priority mode.

At cycle number 9, all four bus units have requested access to the ADC bus with the respective bus request signals being latched the bus request latch as the active request signals A, B, C and D. When both high and low mode priority bus units request access to the bus, the arbiter services the high priority mode bus units and ignores the low priority mode bus unit requests until the high priority mode bus units no longer request access to the bus. At cycle number 9, bus unit B being in the high priority mode has a higher priority than bus unit A. Bus unit B is then granted access to the bus with the signal BG be active during cycle number 10. At the end of cycle number 10, both the bus unit B latched request signal B and the bus unit B grant signal BG along with the signal $\bar{S}$ going inactive. During the time period T6, cycle numbers 11-14, commands and data are transferred on the ADC data bus. At the end of cycle number 14, upon completion of data transfer, the signal $\bar{S}$ goes active to enable the grant of the bus in the next cycle to the requesting bus of the highest priority. In this particular case, bus unit B upon receiving the grant is assigned a lower priority than bus unit A. However, bus unit B is of higher priority mode than requesting bus units C and D which are in the low priority mode.

With bus unit A in the high priority mode and requesting the bus, bus unit A is granted the bus during cycle number 15. At the completion of access to the bus by bus unit A, there are no further requests from bus units in the high priority mode. Accordingly, the arbiter services the low priority mode bus units requesting access to the bus. In this case, bus unit D is now of a higher priority than bus unit C, and is therefore granted access to the bus by the generation of the bus grant signal during cycle number 18. When granted access to the bus, bus unit D is of the lowest priority among low priority mode bus units. When bus unit D is finished with the bus, bus unit C, which has maintained its request and is the only requesting bus unit, is granted access to the bus. After bus unit C is granted access to the bus, bus unit C is assigned a lower priority than bus unit D.

Figure 5H:
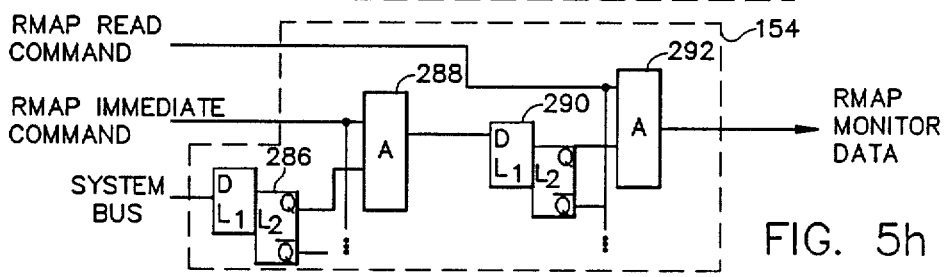

FIG. 5h illustrates the performance monitor feature of the arbiter of the present invention. The performance monitor monitors, for evaluation by the support processor, three important points in the system relative to ADC bus activity. Monitoring takes place for ADC bus request active time, the ADC bus busy time and the storage I/O interface (STIO) buffers full time. These monitor points are sampled at periodic time intervals, typically of once every millisecond, with the data stored in the support processor. The ADC bus busy time data will provide an indication as to whether the bus is over or under utilized. The ADC bus request active time data will be used to indicate the amount of time each ADC bus unit has an active request. The STIO buffers full time data will indicate the amount of time the STIO buffers are full.

The performance monitor data will be utilized for further configuration of the system. An exceedingly high bus request active time can be caused by unbalanced I/O system. For example, one bus unit could have too many high performance devices coupled thereto and would thus utilize much of the bus bandwidth. Based on the performance monitor information, the system could then be reconfigured to balance the bus activity. An exceedingly high bus busy time may also be caused by the STIO buffers being full a high percentage of time. Based upon the performance monitor information, the arbiter could thus be programmed to put the STIO, which also requests the bus, in a high priority mode. Accordingly, the STIO would be given a high percentage of bus bandwidth so as to allow the STIO to empty its buffers more frequently. The performance monitor data could also be used to indicate whether the IOE/IOQ itself is getting sufficient bus bandwidth. Since the IOE/IOQ elements handle all software level I/O instructions, insufficient bandwidth could lead to subsystem performance degradation. Accordingly, the IOQ element could be put into a high priority mode. Furthermore, based on performance monitor data and known time critical needs of specific I/O devices, the arbiter can be programmed to provide maximum adaptability to different I/O configurations, in addition to providing increased availability of the system to time critical devices and improved overall system performance.

FIG. 5h illustrates an exemplary performance monitor circuit. For purposes of simplification, only a single monitoring point circuit is illustrated with the remaining circuits being identical. In FIG. 5h, the performance monitors circuit for one monitor point comprises a SRL latch 286 which is continually set or reset by system activity. For example, the input to latch 286 may be the bus unit A latched request signal A. The Q output of SRL 286 is coupled to an input of AND gate 288. The other input of AND gate 288 is coupled to receive an RMAP immediate command. The output of AND gate 288 is input to SRL 290. The Q output of SRL 290 is input to AND gate 292. The other input of AND gate 292 is coupled to receive an RMAP read command. The output of AND gate 294 provides the RMAP monitor data to the support processor.

SRL 286 is continually set and reset by system activity. SRL 290 is used to capture the state of the SRL 286 when the RMAP immediate command is active. The state of SRL 290 is output as the RMAP monitor data when the RMAP read command is active. The RMAP function may be used while clocks are running, thus avoiding the slower system scan string method of updating the latches. The performance monitor data is transferred to the support processor where it can be analyzed.

We claim:

1. In a system including a common bus and a plurality of users connected to said common bus, and in which each user of said plurality of users includes means for providing a request signal indicating that said user is a requesting user requiring access to said common bus, request signals provided by said plurality of users being indicative of a current user request status, an apparatus for determining priority in access to said common bus, comprising:
   priority feedback means for providing a group of priority signals representative of a user priority hierarchy;
   priority means connected to said priority feedback means and to said plurality of users for receiving said priority signals and responsive to said current user request status for providing a grant signal corresponding to a requesting user having a highest relative priority in said user priority hierarchy among requesting users; and
   said priority feedback means further being responsive to said grant signal for updating said priority signals to represent an updated user priority hierarchy in which said requesting user corresponding to said grant signal has a lowest relative priority.

2. The apparatus of claim 1 wherein said priority means comprises:
   request latch means for receiving and storing at least one request signal each from a corresponding requesting user; and
   priority logic means connected to said priority feedback means and said request latch means for respectively receiving said priority signals and stored request signals, and for performing a logical operation upon said priority signals and said stored request signals so as to generate said grant signal.

3. The apparatus of claim 1 wherein said priority feedback means comprises:
   next state priority logic means connected to said priority means for generating a group of condition signals based upon an initial predetermined user priority hierarchy, said condition signals representative of a comparison in relative priority between each user with respect to each other user;
   priority latch means connected to said next state priority logic means for receiving and storing said condition signals, and for providing an output of stored condition signals as said priority signals; and
   said next state priority logic means for further receiving said grant signal and said priority signals, and for performing a comparison of said priority signals and said grant signal so as to update said condition signals represent to said updated user priority hierarchy.

4. The apparatus of claim 1 wherein certain ones of said users are assigned to high priority mode class and certain other ones of said users are assigned to a low priority mode class and representing a current priority mode status, and wherein said apparatus further comprises priority mode means connected to said priority feedback means and responsive to said current priority mode status for generating high and low priority mode class signals respectively corresponding to high and low priority mode class users of said current priority mode status, said priority feedback means responsive to said high and low priority mode class signals for modifying said priority signals, said modified priority signals representative of a bi-level user priority hierarchy with high priority mode class users being of a higher priority than low priority mode class users with each user having a relative priority with one another within its respective priority mode class, said priority means for receiving said modified priority signals and further responsive to said current user request status for providing said grant signal corresponding to a requesting one of said high priority mode users in said high priority mode class having a highest relative priority among requesting high priority mode class users, and when said current request status is of low priority mode class user requests providing said grant signal corresponding to a requesting one of said low priority mode class users in said low priority mode class having a highest relative priority among requesting low priority mode class users, said priority feedback means responsive to said grant signal for updating said modified priority signals with said updated modified priority signals representative of an updated bi-level user priority hierarchy in which a requesting user corresponding to said grant signal has a lowest relative priority of its respective priority mode class.

5. The apparatus of claim 1 further comprising monitor means coupled to said priority means for sampling and storing said current user request status, said monitor means further responsive to a command signal for providing an output corresponding to said current user request status.

6. In a data system including a common bus, a plurality of users connected to said common bus, and means in each of said plurality of users for producing a user request indicating that said each of said users is a requesting user requiring access to said common bus, a bus arbiter, comprising:
   request collection means connected to said plurality of users for receiving and assembling request signals from said users and for providing, in response to said request signals, a request status signal;
   priority logic connected to said request collection means and responsive to said request status signal and to a user priority signal for providing a grant signal providing common bus access to a requesting user having a highest priority in a user priority, said user priority indicated by said user priority signal; and priority state means connected to said priority logic and responsive to said grant signal for producing said user priority signal to represent a user priority hierarchy.

7. The bus arbiter of claim 6 wherein said request collection means is a latch circuit receiving and storing at least one user request from each of said plurality of users, each of said user requests being indicative of a current user request status, and wherein said priority logic is connected to said priority state means and to said latch circuit for respectively receiving said user priority signal and for performing a logical operation on said priority signal and said user requests to generate said grant signal.

8. The bus arbiter of claim 6 wherein said priority state means comprises:
  next priority state logic connected to said priority logic for generating a group of condition signals based upon an initial user priority hierarchy, said condition signals representative of a comparison in relative priority between each user of said plurality of users with respect to each other user of said plurality of users;
  priority latch means connected to said next priority state logic for receiving and storing said condition signals, and responsive to said condition signals for providing said priority signals; and
  said next priority state logic receiving said priority signal and said grant signal for performing a comparison of said priority signal and grant signal so as to update said condition signals to correspond to an updated user priority hierarchy.

9. The bus arbiter of claim 6 wherein each of said users includes means for producing a user priority signal indicative of a priority mode class of which said each of said users is a member, first users being assigned to a first priority mode class and second users being assigned to a second priority mode class, said first priority mode class being of a higher priority than said second priority mode class, said bus arbiter further including a priority mode means connected to said priority state means and to said plurality of users and responsive to said priority mode signals for producing a user priority relationship signal denoting the relative priority between a first requesting user and a second requesting user, said user priority relationship signal being provided to said priority state means, said priority state means being responsive to said user priority relationship signal and to said grant signal for producing said user priority signal.

* * * * *

UNITED STATES PATENT AND TRADEMARK OFFICE
CERTIFICATE OF CORRECTION

PATENT NO. : 4,953,081

DATED : August 28, 1990

INVENTOR(S) : Feal et al

It is certified that error appears in the above-identified patent and that said Letters Patent is hereby corrected as shown below:

Column 20, line 7, please change "represent to" to --to represent--;
line 10, please insert --a-- between "to" and "high".

Signed and Sealed this

Third Day of March, 1992

Attest:

HARRY F. MANBECK, JR.

*Attesting Officer*  *Commissioner of Patents and Trademarks*